United States Patent
Smith et al.

(10) Patent No.: US 10,894,577 B2
(45) Date of Patent: Jan. 19, 2021

(54) BICYCLE DRIVE SYSTEM

(71) Applicant: CeramicSpeed Sport A/S, Holstebro (DK)

(72) Inventors: Jason Smith, Boulder, CO (US); Morten Opprud Jakobsen, Holstebro (DK); Greg Andrew Vanderbeek, Boulder, CO (US); Simon Elnicki Hafner, Broomfield, CO (US); Hanxiong Yang, Boulder, CO (US); Alexander Jacobson Rosenberry, Lakewood, CO (US); Steven Andrew Simkins, Boulder, CO (US); Chase Dixon Cleveland, Boulder, CO (US); Eric Stefan Perkey, El Segundo, CA (US)

(73) Assignee: CeramicSpeed Sport A/S

( * ) Notice: Subject to any disclaimer, the term of this patent is extended or adjusted under 35 U.S.C. 154(b) by 0 days.

(21) Appl. No.: 16/364,282

(22) Filed: Mar. 26, 2019

(65) Prior Publication Data

US 2019/0300116 A1    Oct. 3, 2019

Related U.S. Application Data

(60) Provisional application No. 62/648,588, filed on Mar. 27, 2018.

(30) Foreign Application Priority Data

Apr. 16, 2018    (DK) ................... 2018 00163

(51) Int. Cl.
*F16H 3/36*    (2006.01)
*B62M 11/06*    (2006.01)
(Continued)

(52) U.S. Cl.
CPC .............. *B62M 11/08* (2013.01); *B62J 23/00* (2013.01); *B62M 17/00* (2013.01); *B62M 25/08* (2013.01); *F16H 3/366* (2013.01); *F16H 55/10* (2013.01)

(58) Field of Classification Search
CPC .......... F16H 3/336; F16H 55/10; F16H 3/366; B62M 11/08; B62M 17/00; B62M 23/00; B62M 25/08
(Continued)

(56) References Cited

U.S. PATENT DOCUMENTS 563,971 A    7/1896    Kohlmeyer
596,884 A *  1/1898    Jamieson
(Continued)

FOREIGN PATENT DOCUMENTS

CN    201472610 U    5/2010
CN    109018174 A    12/2018
(Continued)

OTHER PUBLICATIONS

Danish Patent Application No. PA 201800163, 1st Technical Examination, dated Dec. 22, 2018, 9 pages.
(Continued)

*Primary Examiner* — William C Joyce
(74) *Attorney, Agent, or Firm* — Kilpatrick Townsend Stockton LLP

(57) ABSTRACT

A bicycle drive system includes a front face gear, a rear face gear, a drive shaft, and a front roller-toothed gear assembly coupled to the first end of the drive shaft, and a rear roller-toothed gear assembly coupled to the second end of the drive shaft. Both the front roller-toothed gear assembly and the rear roller-toothed gear assembly include one or more roller elements. The roller-toothed gear assemblies are advantageous in ensuring the bicycle drive system is highly (Continued)

efficient, and is only minimally or not at all affected by dirt, water, contaminants, or other foreign matter typically experienced in un-clean riding conditions.

20 Claims, 9 Drawing Sheets

(51) Int. Cl.
  *B62M 17/00* (2006.01)
  *F16H 55/10* (2006.01)
  *B62J 23/00* (2006.01)
  *B62M 25/08* (2006.01)
(58) Field of Classification Search
  USPC .......................................................... 74/351
  See application file for complete search history.

(56) References Cited

U.S. PATENT DOCUMENTS

| | | | |
|---|---|---|---|
| 608,851 A * | 8/1898 | Foster | 74/351 |
| 609,314 A | 8/1898 | Westhaver | |
| 615,704 A | 12/1898 | Holmes | |
| 715,404 A * | 12/1902 | Markgraf | |
| 824,110 A * | 6/1906 | Golden | |
| 843,471 A * | 2/1907 | Lloyd | 74/351 |
| 1,018,219 A * | 2/1912 | Twombly | F16H 3/366 74/351 |
| 2,770,508 A * | 11/1956 | Smith | F16H 53/06 384/477 |
| 5,704,248 A * | 1/1998 | Knotts | F16H 1/12 248/562 |
| 6,280,097 B1 * | 8/2001 | Mues | F16C 13/006 384/449 |
| 6,685,205 B1 | 2/2004 | Weaver et al. | |
| 6,807,932 B2 * | 10/2004 | Abe | F01L 1/181 74/569 |
| 7,434,489 B1 | 10/2008 | Scranton | |
| 2009/0048051 A1 * | 2/2009 | Koleoglou | F16H 55/10 475/183 |
| 2013/0024137 A1 * | 1/2013 | Grassi | G01L 3/108 702/43 |

FOREIGN PATENT DOCUMENTS

| | | |
|---|---|---|
| DE | 102016201455 B3 | 6/2017 |
| FR | 469757 | 8/1914 |
| KR | 10-0217891 B1 | 12/1997 |
| WO | 2006/049366 A1 | 5/2006 |
| WO | 2006049366 A1 | 5/2006 |
| WO | 2007132999 A1 | 11/2007 |
| WO | 2015134685 A1 | 9/2015 |

OTHER PUBLICATIONS

Danish Patent Application No. PA 201800163, $2^{nd}$ Technical Examination, dated Jan. 18, 2019, 3 pages.
Danish Patent Application No. PA 201800163, Intention to Grant, dated Feb. 22, 2019, 3 pages.
EP Application No. 19164619.9, Extended European Search Report dated Aug. 27, 2019 (11 pages).

* cited by examiner

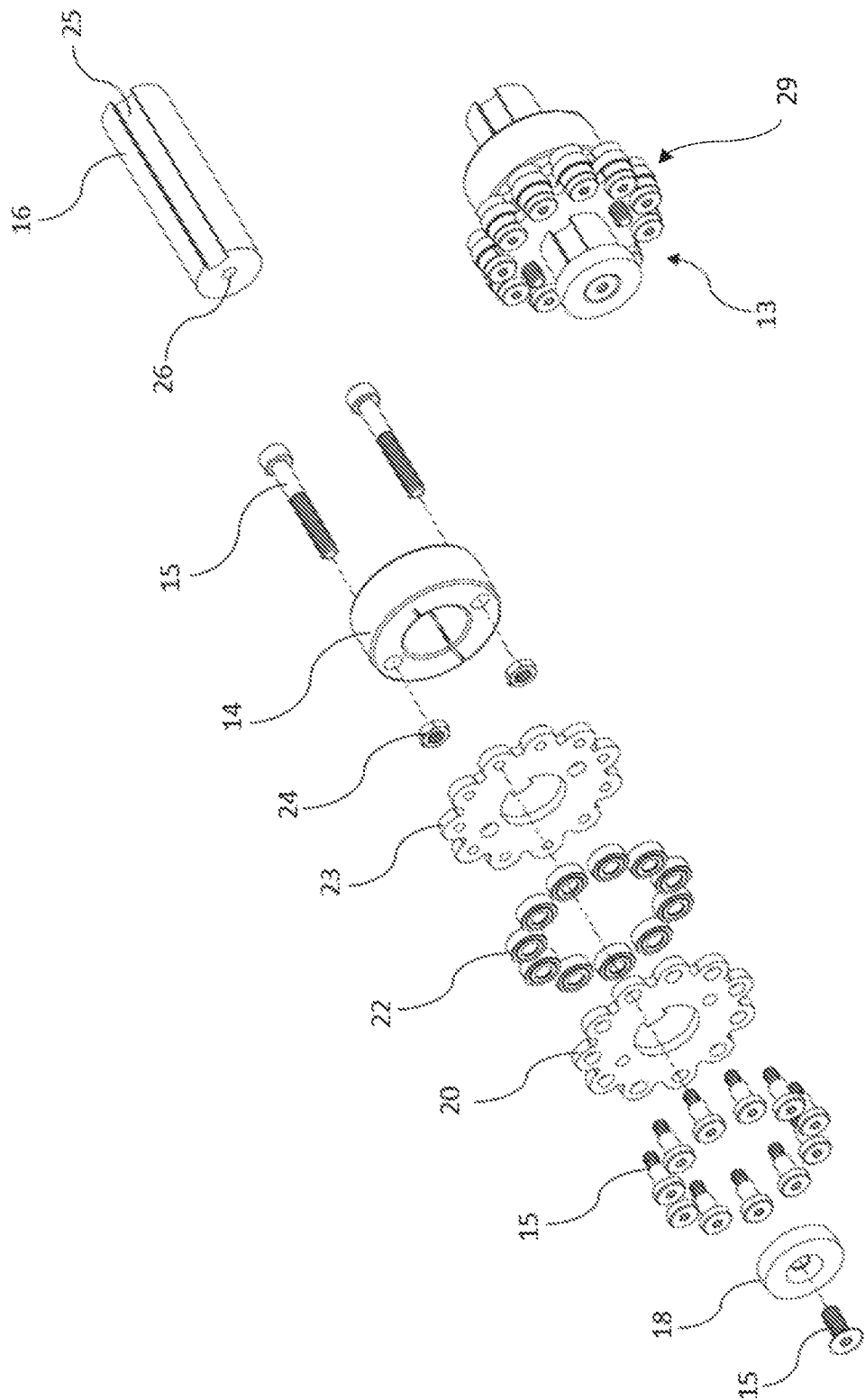

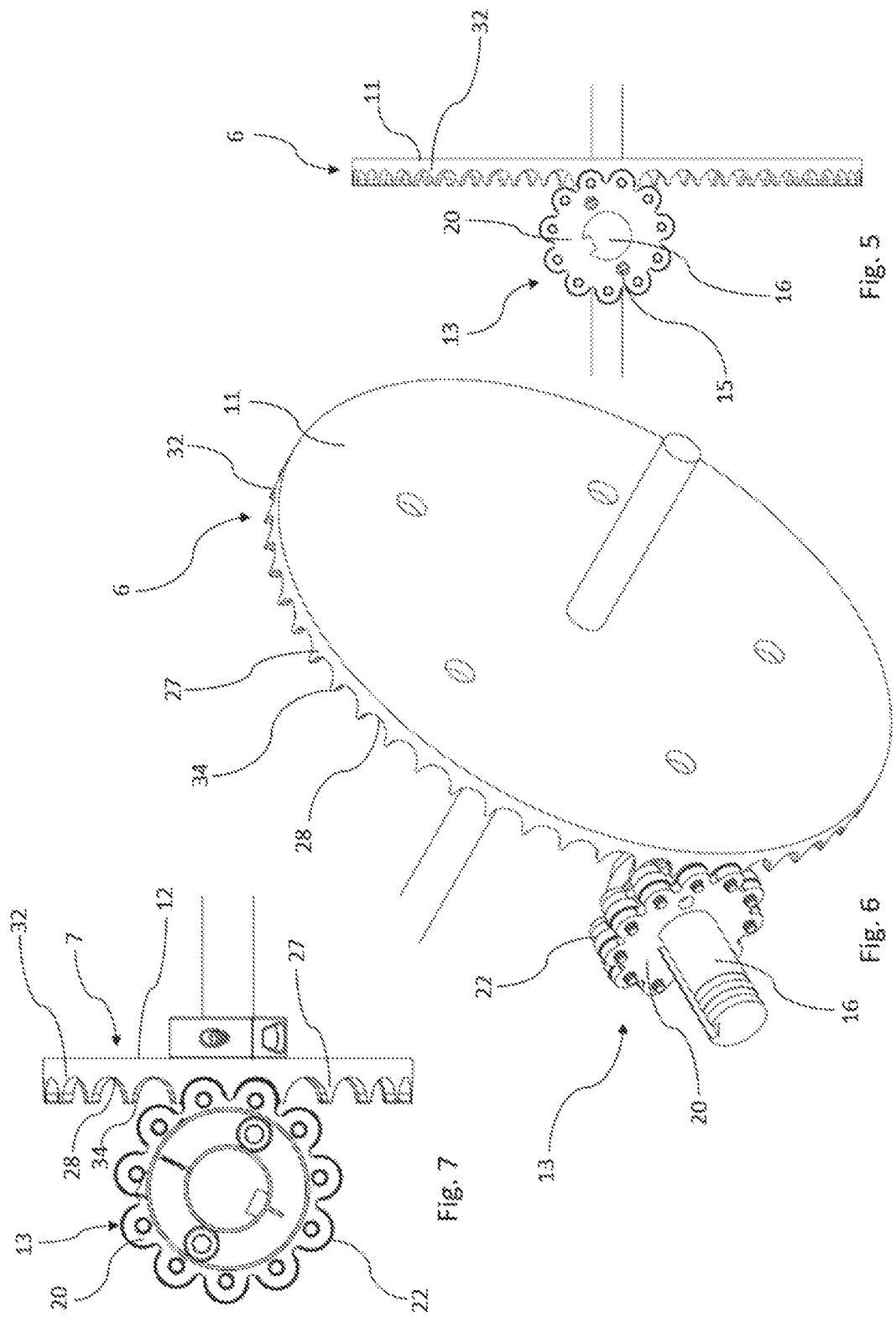

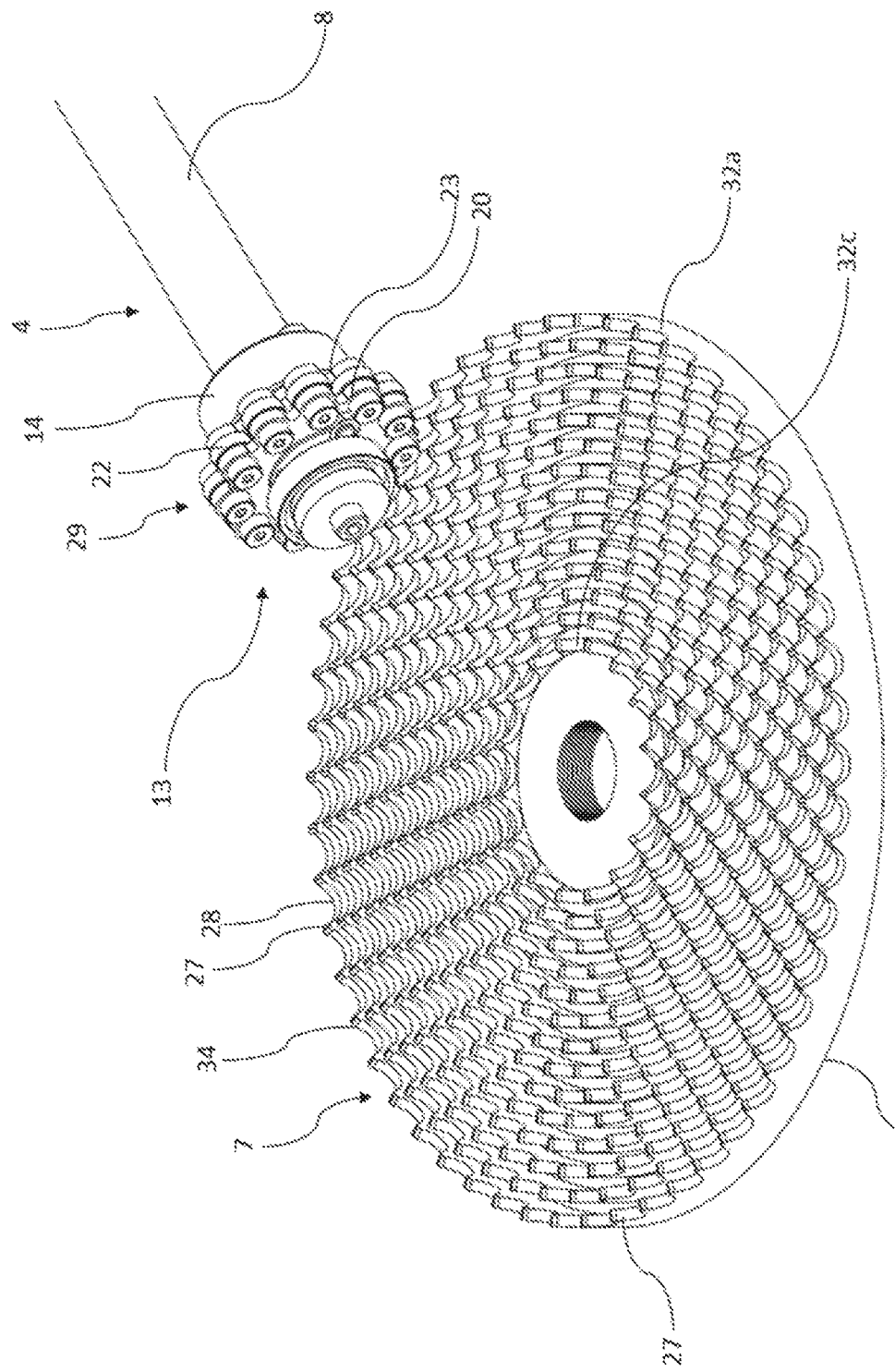

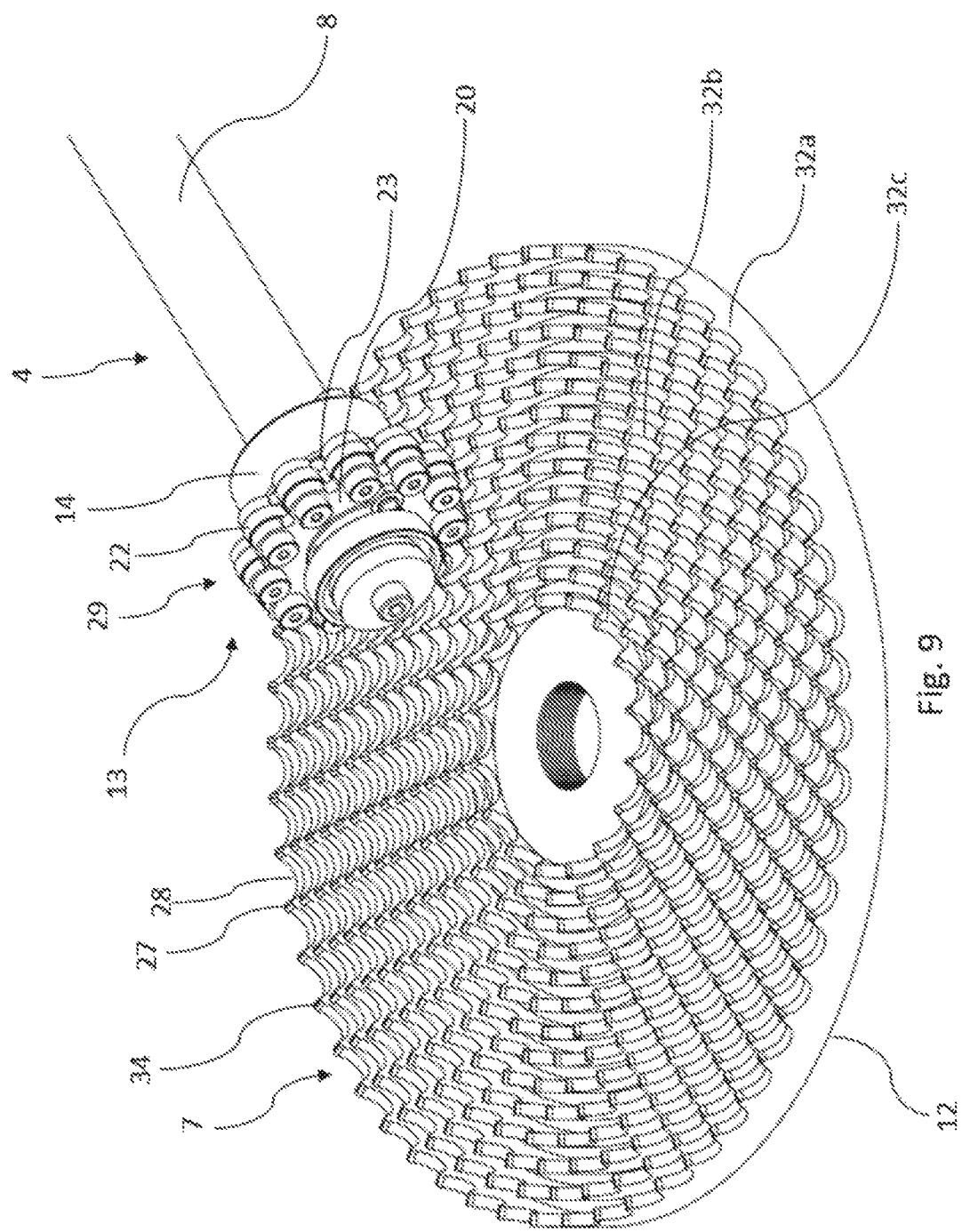

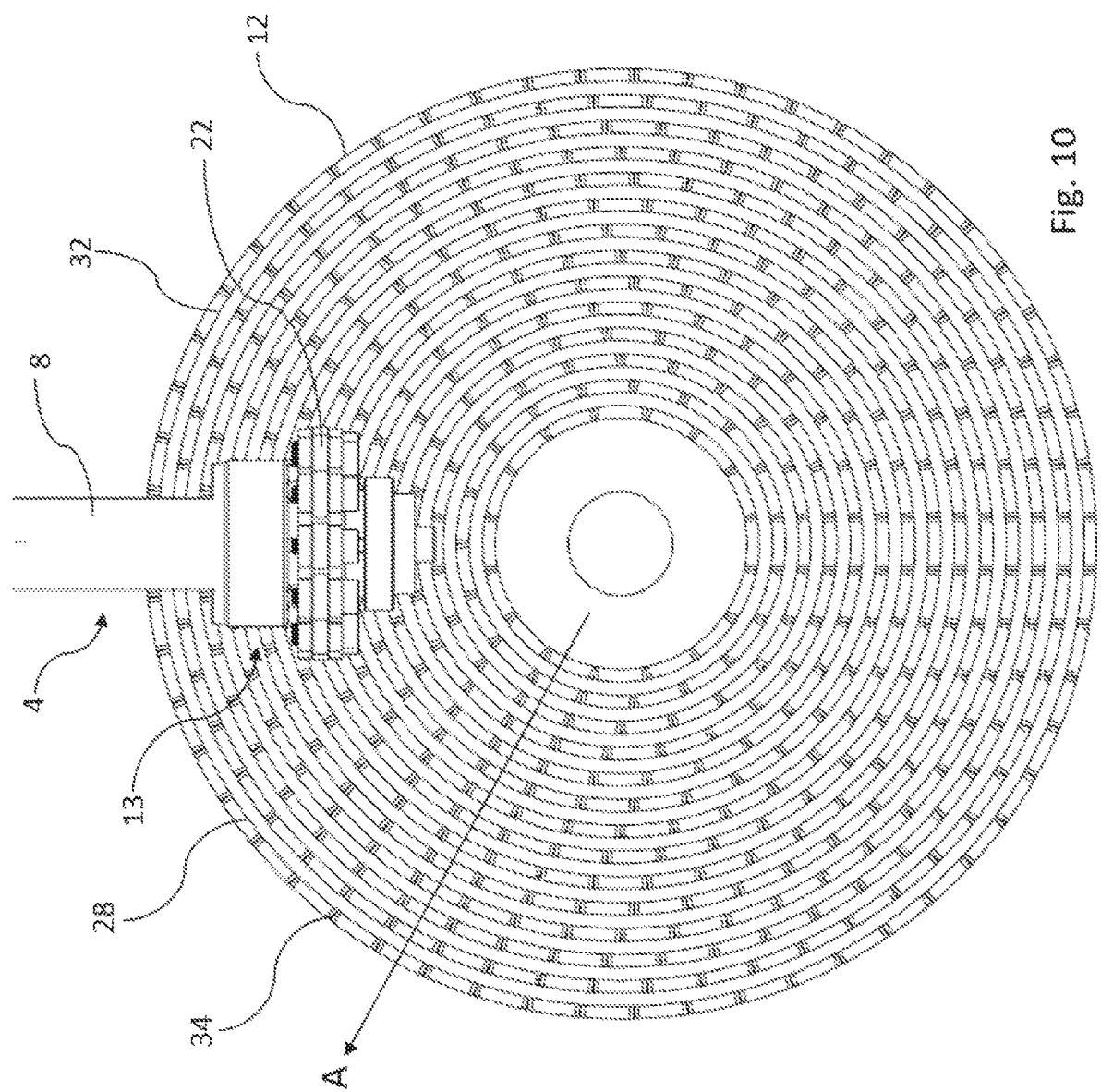

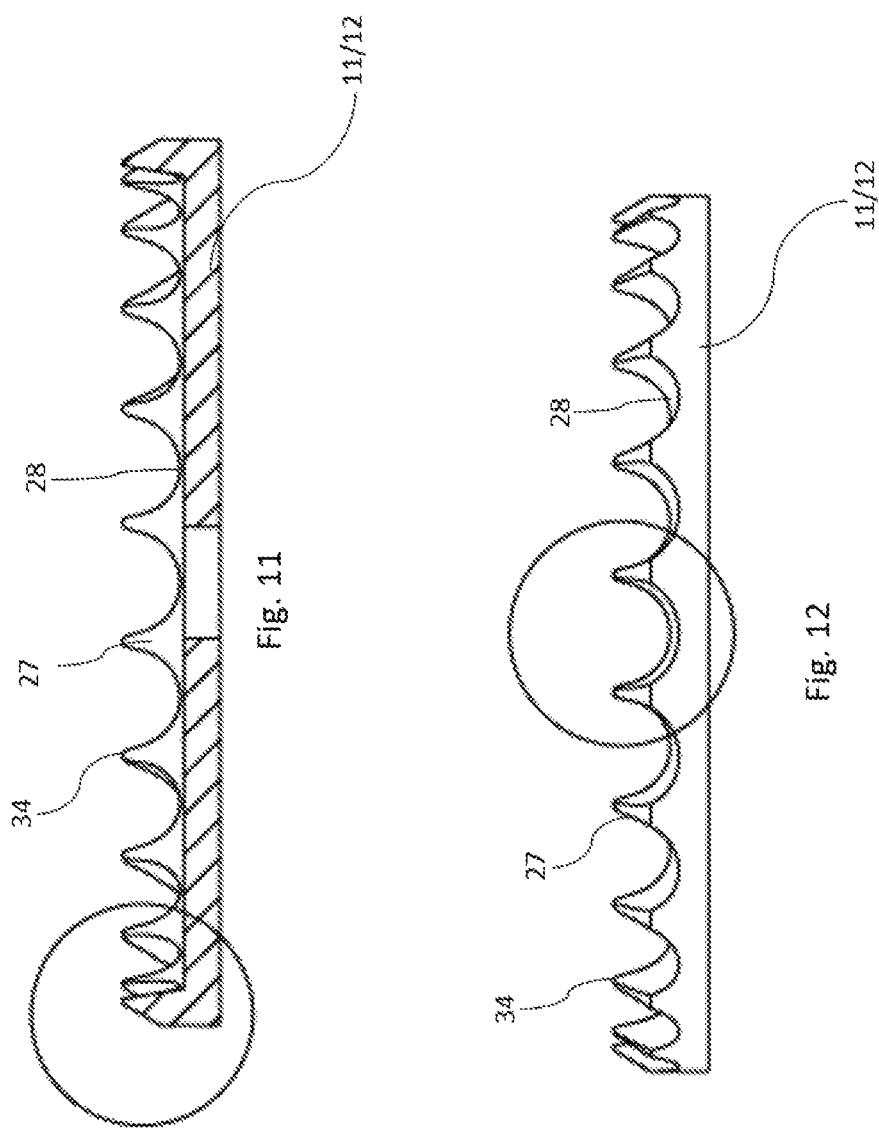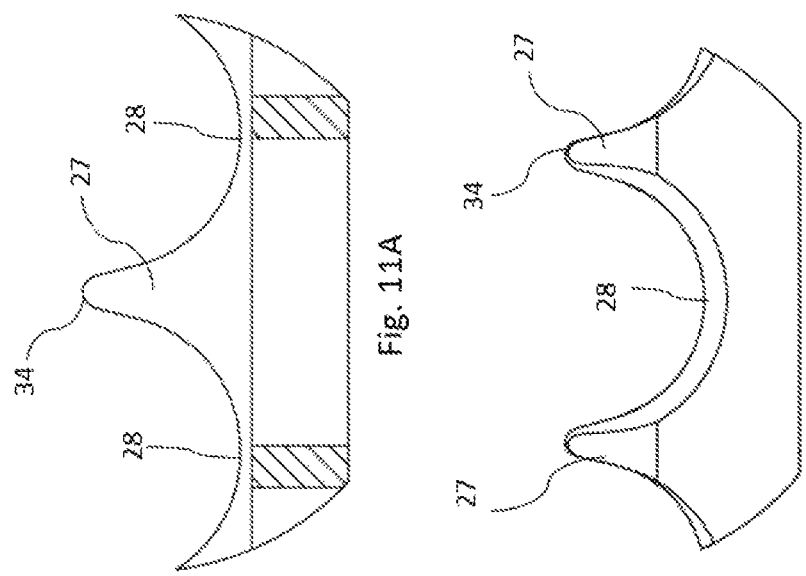

BICYCLE DRIVE SYSTEM

REFERENCE TO RELATED APPLICATIONS

This application is related to and claims priority benefits from U.S. Provisional Application No. 62/648,588, filed Mar. 27, 2018 and entitled BICYCLE DRIVE SYSTEM, and Danish Application No. PA 201800163, filed Apr. 16, 2018 and entitled BICYCLE DRIVE SYSTEM, the contents of which are hereby incorporated by reference in their entireties.

FIELD OF THE INVENTION

The present invention relates to bicycles. In particular, the present invention relates to a bicycle drive system.

BACKGROUND

Conventional multi-gear bicycle drivetrains utilize a chain drive system comprising a chain, sprockets and rear derailleur to transfer rider power from the pedals to the rear wheel of the bicycle, and allow multiple gear selections. Some disadvantages of a conventional multi-gear chain drive are as follows:

- The overall power transfer efficiency of a multi-gear bicycle chain drive can be relatively low. Friction is created within the chain drive system due to the multitude of rotating drivetrain parts and individual chain links articulating as the links engage and disengage the front chain ring, rear sprockets, and zig-zag through the rear derailleur pulley wheels.
- Multi-gear rear sprockets subject the chain to a misaligned condition (also known as cross-chaining) when the chain is placed in higher gear sprockets, and lower gear sprockets. A misaligned chain increases the friction level.
- The links of a conventional bicycle chain are not sealed at the articulation point between the links. Dirt, contaminants, and foreign matter can become lodged on, and within, the chain links, which can increase the friction level.
- Lubrication of exposed chain links is required on a regular basis.
- The chain and rear derailleur must be adjusted correctly otherwise chain slippage and gear skipping may occur.
- Clothing, grass, or other objects may also become caught in the chain and sprockets.
- The rear derailleur mechanism hangs below and protrudes outwards from the rear section of the bike frame. Foreign objects in the pathway of the mechanism can be lodged within the mechanism, potentially causing damage to the drivetrain or creating an unsafe condition while riding. Additionally, the protruding rear derailleur mechanism creates air turbulence and decreases the aerodynamic efficiency of the bicycle.

Alternatively, bicycle drivetrains utilizing a shaft drive, instead of a chain, to transmit rider power to the rear wheel offer several advantages when compared to conventional chain drive systems. Yet, the present state-of-the-art shaft drive systems are relatively inefficient, even more so than chain drives.

Some bicycle shaft drive systems use traditional fixed-teeth gears or a roller-bushing system to transmit rotational forces. In both the fixed-teeth gears and the roller-bushing system, the teeth/bushings engages with a crown gear and creates a sliding action as the rotational force is applied and transferred. Even with the advancements in tooth design and tooth geometries, some level of sliding friction will occur in any of the previously described gear sets. Regardless of using a fixed teeth or a roller bushing system, all shaft drives described in the prior art create relatively high levels of friction during operation. This is due to both systems uses a simple sliding interface whether using the fixed teeth on the drive shaft pinion gears engaging with and sliding against the opposing fixed teeth of the gear cogs, or a roller bushing system which slides against the fixed teeth of the gear cogs.

Prior art discloses several bicycle shaft drive systems. Present bicycle shaft drive systems use either a fixed-teeth gears meshing with fixed-teeth gears, or a roller-bushing system engaging with fixed teeth on a crown gear to provide for rotational power transfer. The prior art document U.S. Pat. No. 5,078,416 discloses a bicycle shaft drive, which uses bevel-shaped fixed-tooth gears to receive and transmit rotational power. The prior art document U.S. Pub. No. 2011/0062678 discloses a bicycle shaft drive which uses flat-shaped fixed-tooth gears to receive and transmit rotational power. The prior art document U.S. Pat. No. 7,434,489 discloses a bicycle shaft drive which uses ball-shaped fixed-teeth gears and cylinder-shaped fixed-teeth gears to receive and transmit rotational power. Both prior art document WO 2006/049366 and WO 2007/132999 describe bicycle drive shafts which includes bushings as rolling elements which engages in a crown gear. These roller-bushing systems provide for rotation of the rollers by using a simple sliding interface on a support member. These systems result in an inefficient power transfer system and have a high wear rate due to a high level of friction, a high degree of maintenance, and a high interval of replacing parts. Therefore, the existing bicycle shaft drive systems are not considered high-efficiency drive systems.

In view of existing bicycle drivetrains, there is a need for a multi-gear bicycle drive system, which is highly efficient, and maintains high efficiency levels regardless of the riding conditions.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain examples, a bicycle drive system includes a drive shaft, the drive shaft being configured for connecting a front face and rear face gear of the bicycle drive system. The bicycle drive system also includes a front face gear including a cog-disk and at least one concentric gear-ring(s), a rear face gear including a cog-disk and at least one concentric gear-ring(s), and a drive shaft having an axis of rotation and having a first end of the drive shaft and a second end. In some examples, the drive shaft includes a roller-toothed gear assembly coupled to the first end of the drive shaft and/or a roller-toothed gear assembly coupled to the second end of the drive shaft in which the roller-toothed gear assembly(s) is configured to mesh with one of the concentric gear-rings on the front face gear or the rear face gear, so that the rotational movement of the gear-ring is transmitted to the shaft. The one or more roller-toothed gear assembly includes one or more roller elements. The one or more roller elements of the roller-toothed gear assembly is engaging one of the concentric gear-rings of the front or rear face gear. The roller elements include ball bearings, roller bearings, and/or double row ball bearings.

In some examples, the front roller-toothed gear assembly is coupled to the first end of the drive shaft and the roller-toothed gear assembly is coupled to the second end of the drive shaft. In various examples, the front roller-toothed gear assembly and the rear roller-toothed gear assembly include one or more roller elements. In some examples, the one or more roller elements of the front roller-toothed gear assembly is engaging one of the concentric gear-rings of the front face gear and the one or more roller elements of the rear roller-toothed gear assembly is engaging one of the concentric gear-rings of the rear face gear, so that the rotational movement of the front face gear is transmitted to the drive shaft and thereby to the rear face gear.

In various examples, the front roller-toothed gear assembly includes a spinner, and the spinner includes roller elements uniformly distributed at a radial distance from the center. In certain examples, the drive shaft is: a telescopic drive shaft, with coaxial inner and outer shafts; or a fixed length multi sleeve coaxial shaft; or a single shaft. In some aspects, the one or more gear-rings of the rear face gear and/or of the front face gear includes a plurality of teeth and tooth valleys, and the teeth extend at an angle to a surface plane of the cog-disk in the range of 0 to 120°. In some embodiments, the one or more gear rings of the rear face gear and/or of the front face gear includes a plurality of teeth and tooth valleys, and the teeth on the front face gear are of identical geometry, and/or the teeth on the rear face gear are of identical geometry.

In certain examples, the rear face gear includes a number of gear rings and the teeth in at least some of the rings are placed so as to form a shift channel of teeth valleys extending in a radial direction of the cog-disk. In various cases, the teeth are placed to form a multiple of shift channels extending in different radial directions.

In various examples, the bicycle drive system is at least partly enclosed in a protective cover. In some cases, an electromechanical gear-selection device is positioned inside of the drive shaft and connected to the gear shifting controller and the rear roller-toothed gear assembly. In some embodiments, the drive shaft includes one or more torsional strain gauges.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

FIG. 4 shows a schematic drawing of an exploded view of an embodiment of the roller-toothed gear assembly.

FIG. 5 shows a front face gear engaged with the roller elements of the front spinner in the front roller-toothed gear assembly according to an embodiment of the invention.

FIG. 6 illustrates a front face gear engaged with the roller elements of the front spinner in the front roller-toothed gear assembly according to an embodiment of the invention.

FIG. 7 illustrates a rear face gear engaged with the roller elements of the rear spinner in the rear roller-toothed gear assembly according to an embodiment of the invention.

FIG. 8 illustrates the rear roller-toothed gear assembly engaged with a multi-gear rear face gear according to an embodiment of the invention.

FIG. 9 illustrates the rear roller-toothed gear assembly engaged with a multi-gear rear face gear according to an embodiment of the invention.

FIG. 10 illustrates a shift channel on the multi-gear rear face gear according to an embodiment of the invention.

FIGS. 11 and 11A illustrate a tooth profile of the rear or front face gear according to an embodiment of the invention.

FIGS. 12 and 12A illustrate a tooth profile of the rear or front face gear according to an embodiment of the invention.

BRIEF DESCRIPTION

Figure 1:
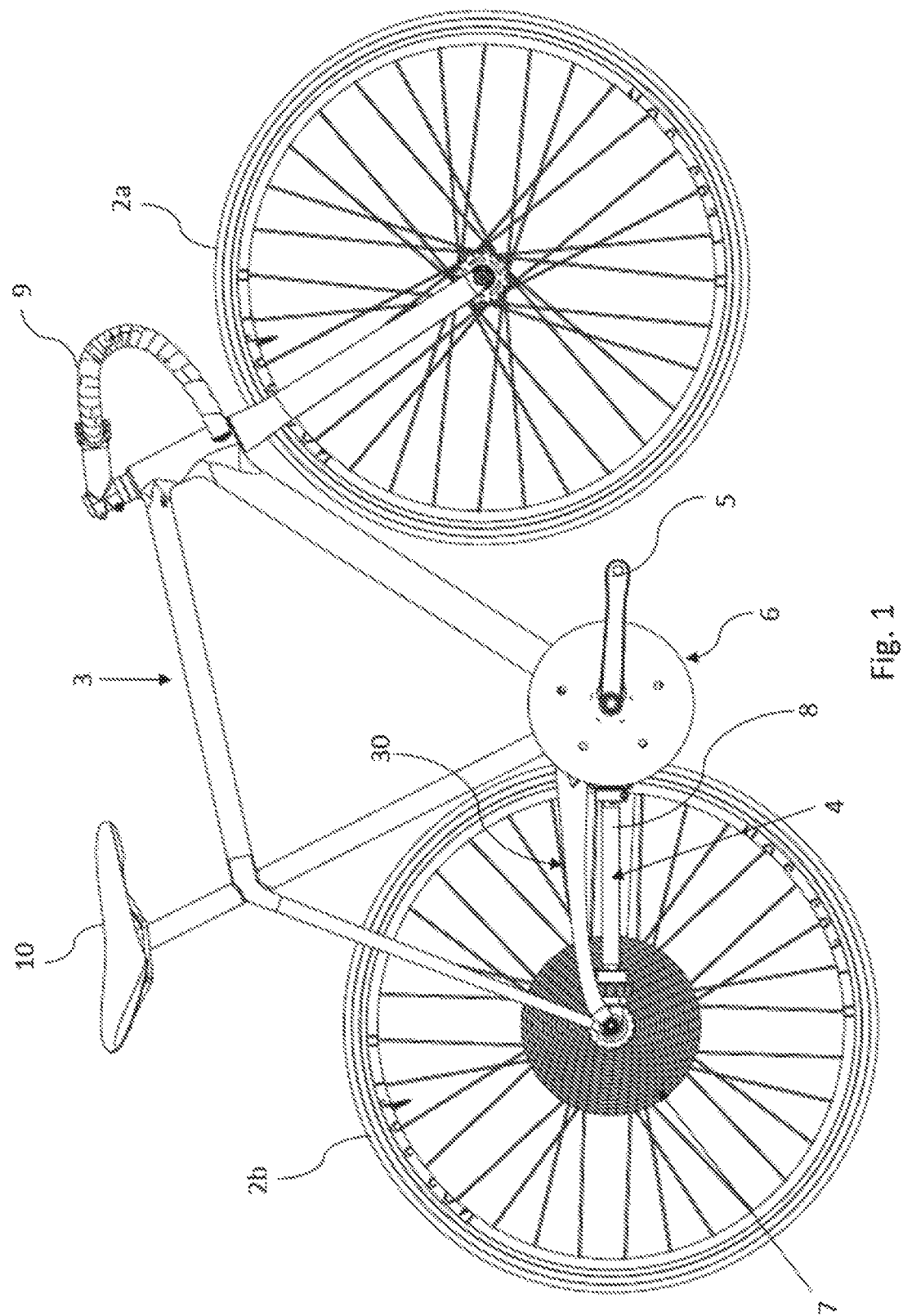
FIG. 1 is a side view of a bicycle with the bicycle drive system according to an embodiment of the invention.

It is an object of this invention to provide a bicycle having a drive system, which creates low friction and therefore provides for a highly efficient means of rider power transfer from the pedals to the rear wheel. It is also an object of the invention to provide a bicycle having a drive system with high efficiency and which can change gears to allow for multiple final drive ratios. Another object of the invention is to provide a bicycle having a drive system with high efficiency, in which the efficiency of the system is not affected by dirt, water, contaminants, or other foreign matter typically experienced in un-clean riding conditions. The use of bearings, as opposed to bushings or fixed teeth, results in a power transfer system which is significantly more efficient and has a much lower wear rate than the systems described in the prior art documents. With the present invention, the bike rider will experience a drive system with a lower level of friction, a lower degree of maintenance, and lower interval of replacing parts when compared to the bushing or fixed teeth designs.

The invention relates to a bicycle drive system comprising a drive shaft, the drive shaft being configured for connecting a connecting a front face gear and a rear face gear of the bicycle drive system, in which the bicycle drive system comprising: a front face gear comprising a cog-disk and at least one concentric gear-ring(s); and a rear face gear comprising a cog-disk and at least one concentric gear-ring(s); and a drive shaft having an axis of rotation and having a first end of the drive shaft and a second end; and wherein the drive shaft further comprising a roller-toothed gear assembly coupled to the first end of the drive shaft and/or a roller-toothed gear assembly coupled to the second end of the drive shaft in which the roller-toothed gear assembly(s)

is configured to mesh with one of the concentric gear-rings on the front face gear or the rear face gear, so that the rotational movement of the front gear-ring is transmitted to the shaft, and the shaft likewise transmits rotational movement to the rear gear-ring; wherein the one or more roller-toothed gear assembly includes one or more roller elements; and the one or more roller elements of the roller-toothed gear assembly is engaging one of the concentric gear-rings of the front or rear face gear, and wherein the roller elements include ball bearings, roller bearings, and/or double row ball bearings.

Using a bicycle drive shaft has been extremely disadvantageous until now. In a conventional bicycle drive shaft system, the gear teeth include fixed teeth or a roller-bushing system, which are generally applied on both the shaft and engaging the front and rear face gears. The action of fixed teeth or roller-bushings meshing and therefore sliding against adjacent fixed teeth creates significantly high friction thereby in practice this type of gear is considered generally unsuitable and non-profitable.

This invention illustrates a highly advantageously bicycle drive system with a minimal amount of friction produced. This is due to the roller elements in the roller-toothed gear assembly replacing the sliding interaction of conventional fixed gear teeth with a lower-friction rolling interaction. By the use of roller elements according to this invention, this type of force and torque transfer from the pedals to the rear wheel has proven to be physically possible and profitable because of the extremely reduced friction forces between the front and rear face gears and the respective roller elements.

The roller elements on the one or more roller-toothed gear assembly(s) in the bicycle drive systems causes the system's reduction in friction when compared to conventional bicycle drive shaft systems. Using only one roller-toothed gear assembly meshing with either the front or rear face gear reduces the friction in the bicycle drive system considerably.

To maximize the friction reduction in the system, it is advantageously to have one roller-toothed gear assembly attached to the first end of the drive shaft and meshing with the front face gear and one roller-toothed gear assembly attached to the second end of the drive shaft and meshing with the rear face gear.

Therefore, in one embodiment of the invention, the bicycle drive system comprising a front face gear includes a cog-disk and at least one concentric gear-ring(s); and a rear face gear includes a cog-disk and at least one concentric gear-ring(s); and a drive shaft having an axis of rotation and having a first end and a second end; and a front roller-toothed gear assembly coupled to the front end of the drive shaft and configured to mesh with one of the concentric gear-rings on the front face gear so that the rotational movement of the front gear-ring is transmitted to the shaft; and a rear roller-toothed gear assembly coupled to the second end of the drive shaft and engaging one of the concentric gear-rings on the rear face gear so that the rotational movement of the shaft is transmitted to the rear face gear; wherein the front roller-toothed gear assembly and/or the rear roller-toothed gear assembly includes one or more roller elements; and the one or more roller elements of the front roller-toothed gear assembly is engaging one of the concentric gear-rings of the front face gear; and/or one or more roller elements of the rear roller-toothed gear assembly is engaging one of the concentric gear-rings of the rear face gear, so that the rotational movement of the front face gear is transmitted to the shaft and thereby to the rear face gear.

The front face gear is connected to a crank arm, which in turn is connected to the crank arm axle. The pedal is connected to the crank arm. A rider forcing the pedals around ensures that the front face gear is rotating. The front face gear includes a cog-disk and at least one concentric gear-ring(s); preferably, the front face gear includes a cog-disk and one or two concentric gear-rings. By concentric gear-rings, it is meant concentrically disposed rings or circular paths of gear teeth where the rings are of different diameters.

The cog-disk is a disk which might be completely solid, or alternatively a solid disk with holes. The cog-disk may have any desired shape, preferably round or oval. The material of the cog-disk is preferably metal, but might be any suitable material, which is not easily breakable or deformable while bicycle riding and which can withstand rain, mud, dirt and dust particles.

In one embodiment, the front face gear includes a cog-disk and one concentric gear-ring, and has thereby one gear-ring with a plurality of gear teeth and a plurality of tooth valleys.

In a further embodiment, the front face gear includes a cog-disk and two concentric gear-rings, and thereby has two concentrically disposed gear-rings, wherein the two gear-rings have different diameters. Both gear-rings having a plurality of gear teeth and a plurality of tooth valleys of identical or near identical geometry, however the two gear-rings do not have the same number of teeth. The radial spacing between the gear-rings is preferably such, that the front roller-toothed gear assembly may only be meshed and engaged with a single gear-ring at a time. The concentric gear-ring radial spacing may thereby match the width of the roller elements of the roller-toothed gear assembly, or the radial spacing may be narrower than the width of the roller elements if the gear-ring teeth width is narrower than the width of the roller elements, or the radial spacing may be wider than the width of the roller elements.

The front roller-toothed gear assembly is positioned along the axis of the drive shaft such that the roller-toothed gear assembly engages with either of the two gear-rings on the front face gear.

In an alternative embodiment, the front face gear includes a cog-disk and a plurality of concentric gear-rings, and thereby has a plurality of concentrically disposed gear-rings, wherein the plurality of gear-rings have different diameters. The plurality of gear-rings having a plurality of gear teeth and a plurality of tooth valleys of identical or near identical geometry, however the gear-rings do not have the same number of teeth. The spacing between the rings is such that the front roller-toothed gear assembly may only be meshed and engaged with a single gear-ring at a time. The front roller-toothed gear assembly can be selectively positioned, fore and aft, along the longitudinal axis of the drive shaft, into a mesh state with any of the plurality of gear-rings on the front face gear as desired. The front roller-toothed gear assembly is positioned by a shifting mechanism. The shifting mechanisms ensures which gear-ring the front roller-toothed gear is engaging.

In a further embodiment, the rear face gear includes a rotational plane parallel to or near parallel to the rear wheel and a co-axial relationship to the rear wheel axle.

The rear face gear includes a cog-disk and a single or a plurality of concentric gear-rings. By concentric gear-rings is meant concentrically disposed rings of gear teeth, the rings having different diameters. The spacing between the rings is such that the rear roller-toothed gear assembly may be meshed and engaged with a single gear-ring at a time.

The rear face gear may include any number of desired single or concentric gear-rings; preferably, the number of single or concentric gear-rings is from about 1 to 20; more preferably, the number of concentric gear-rings is from about 10 to 18; most preferably, the number of concentric gear-rings are 12 to 15.

A front face gear transmits rotational torque to the front roller-toothed gear assembly. Specifically, the rotational force is transmitted through meshing and engaging of, and between, one or more teeth of a front face gear and the engaged and adjacent one or more roller elements of the front roller-toothed gear assembly.

Rotational torque is then transmitted from the front roller-toothed gear assembly, to the drive shaft, and from the drive shaft to the rear roller-toothed gear assembly.

A rear face gear receives rotational torque from the rear roller-toothed gear assembly. Specifically, the rotational force is transmitted through the meshing and engaging of, and between, one or more roller elements of the rear roller-toothed gear assembly and the engaged and adjacent one or more teeth of a rear gear-ring.

The rear roller-toothed gear assembly is positioned along the axis of the drive shaft such that the roller-toothed gear assembly engages with the single or any of the plurality of gear-rings on the rear face gear as desired.

The rear face gear transfers rotational torque to the rear wheel via its coupling to the rear wheel shaft.

The front roller-toothed gear assembly and/or the rear roller-toothed gear assembly includes a spinner. The spinner(s) includes a plurality of roller elements. The roller elements ensure that the bicycle drive system produces a low friction level.

In a preferred embodiment, both the front roller-toothed gear assembly and the rear roller-toothed gear assembly each include a spinner. Both the front and rear spinners include a plurality of roller elements. Utilization of two spinners in the bicycle drive system, i.e. both a front and a rear spinner, produces an overall lower friction level than if only a single front or single rear spinner was used.

In one embodiment the spinner is attached to a keyed connector. The keyed connector has a keyway and the spinner is built onto the keyed connector. The connector ensures that the front and rear spinners can be mounted on the first end and second end of the drive shaft by using a collar or any other conventional means.

In one embodiment of the invention, the front roller-toothed gear assembly and rear roller-toothed gear assembly are equivalent in design. I.e., the front roller-toothed gear assembly, which includes the front spinner, and the rear roller-toothed gear assembly, which includes the rear spinner, have spinners with equal diameters, and/or included equally of the same number of roller elements, and/or the same size of the roller elements, and/or the same type of roller elements. In addition, the tooth profile of the front and rear face gears are identical or nearly identical.

In an alternative embodiment, the front roller-toothed gear assembly and rear roller-toothed gear assembly are not equal in design. The design of the front roller-toothed gear assembly and the rear roller-toothed gear assembly, and the respective spinners contained in each, can differ in the diameters of the respective spinners, and/or can differ in the number of roller elements, and/or can differ in the size of the roller elements, and/or can differ in the type of roller elements. A smaller or larger spinner in the rear or front might increase the effectiveness of gear shifting.

In an alternative embodiment of the invention, the front roller-toothed gear assembly's and the rear roller-toothed gear assembly's respective spinners have different diameters. Varying the ratio of the diameters of the front and rear spinners, with respect to each other, is one method of creating generally higher or generally lower overall gearing for the entire drive system, aside from using the individual gear ratios provided by using selected front or rear face gears.

In one embodiment of the invention, the front roller-toothed gear assembly's and the rear roller-toothed gear assembly's respective spinners each include at least two roller elements. Advantageously, each spinner has roller elements uniformly distributed at a radial distance from the center and uniform arc length relative to each roller element. By uniformly distributed means that the distance between each roller element is the same for all the roller elements. The radial distance means the distance between the axis of rotation of the spinner to the outer edge of the roller elements. The radial distance is constant for all the roller elements in each spinner. The radial distance is dependent on the spinner size and the roller element sizes. The roller elements may be placed adjacent to each other, or the roller elements might be separated by a solid plate, or fixed to the spinner plate(s) with a certain distance between each roller element. All roller elements are placed in the spinner at a radial distance, so they can mesh and engage with the teeth and tooth valleys of the gear-rings on the front face gear or rear face gear.

Therefore, in one embodiment of the invention, the front roller-toothed gear assembly includes a spinner, and the spinner has roller elements uniformly distributed at a radial distance from the center.

In a preferred embodiment of the invention, the front and rear roller-toothed gear assembly spinners each include 3 to 25 roller elements; more preferably between 6 to 18 roller elements; and most preferably between 10 to 14 roller elements.

The spinner includes a plurality of roller elements and at least one spinner plate. Preferably, the spinner includes two spinner plates. The spinner plate(s) ensures that the roller elements are securely attached to the spinner.

In the context of this description, the term "rolling elements" refers to the general action, description, and existence of rolling and friction-reducing elements. The term "roller elements" refers to the same rolling elements, after which the rolling elements are incorporated into the invention. When the rolling elements are incorporated into the spinner, the "rolling elements" becomes "roller elements."

The roller elements in the spinner may be any rolling elements, wherein an element is free to rotate about its rotational axis. The roller elements composing the spinner have the capability of intermeshing, contacting, and engaging the adjacent and corresponding teeth of the face gears.

Examples of rolling elements include conventional ball bearings, conventional roller bearings, double row ball bearings, exposed rolling balls positioned radially around the center axis by a freely rotating ball-cage, exposed rolling cylindrical rollers positioned radially to the center axis by a freely rotating roller-cage, and/or multiple bearings connected in a coaxial manner at the inner races.

In one embodiment of the invention, the rolling elements may include different types of rolling elements, whereas in other embodiments of the invention, the rolling elements includes the same type of rolling elements. Preferably the rolling elements includes the same type of rolling elements.

Preferably, the roller elements are ball bearings, roller bearings, and/or double row ball bearings. Other types of bearings may also be used in the invention, which uses rollers located between an inner raceway and an outer raceway. Preferably the rollers are balls or cylinders.

The roller elements are preferably composed of steel/alloy bearings, ceramic bearings, ceramic-hybrid bearings, other low-friction materials, or a combination of materials to produce rolling elements with the lowest friction possible.

If ball bearings are used as roller elements, then these are preferably composed of steel/alloy, ceramic bearings, ceramic-hybrid bearings, other low friction materials, or a combination of materials to produce roller elements with the lowest friction possible.

A conventional ball bearing includes an outer raceway, an inner raceway and a plurality of balls located between the inner and outer raceway.

The aspect ratio (roller length/roller diameter) of the rolling elements are ≤1, preferably the aspect ratio is ≤0.8, and most preferably the aspect ratio is ≤0.5. The aspect ratio of the rolling elements ensures a rolling element which is highly efficient and reduces friction of the drive shaft.

In one embodiment, the spinner, composing the roller-toothed gear assembly, is designed such that a plurality of ball bearings is utilized as the roller elements.

In an embodiment, the spinner includes an outer plate and an inner plate. A plurality of roller elements are located between the outer and inner plates. The two plates engage the shaft of the center axis of each roller element comprising the spinner. This renders each roller element free to rotate around its center axis.

The roller elements of the spinner meshing with the fixed teeth of a gear-ring ensure a low friction transfer of power by utilizing a rolling action.

The material of the plates may be any suitable material. Preferably, the material of the plates is either metallic, or a plastic, or a composite, or combinations hereof.

In an alternative embodiment, the spinner includes an outer and an inner plate. A plurality of roller elements are located between the outer and inner plates. The two plates engage the outer race of the roller elements. An axle pin connects the inner races of the roller elements and then engages a gear-ring.

In an alternative embodiment, the spinner includes a single plate. A plurality of roller elements is located and attached to one side of the single plate. This creates additional clearance to ensure the roller elements are able to engage with the teeth and tooth valleys of the gear-rings more freely.

In an alternative embodiment, the spinner includes a single plate. A plurality of ball bearings is located and attached to one side of the plate.

In an alternative embodiment, the spinner includes a single plate and wherein the inner axis of rotation component of the roller elements and the radially located arms of the plate are one uniform piece. I.e., the roller elements are not separate components, which are attached to the arms of the plate, as in previous embodiments, but rather a one-piece system. In this embodiment, a roller element's center, which includes the axis of rotation of the roller element, is an integral part of the plate. This minimizes the number of manufacturing parts and may create a spinner with a narrower overall width.

In an alternative embodiment, the spinner includes an outer plate and an inner plate, and a plurality of ball bearings located on each of the outer and inner plates. The outer races of the bearings are connected to the plates. Pins connect the inner races of the bearings of the outer plate to the inner races of the adjacent bearings of inner plate, coaxially. This renders the inner raceways, and subsequently the connecting pins, free to rotate within the outer raceway of the ball bearing. The connecting pin, which is free to rotate, acts as the roller element and meshes with the teeth of the gear-ring.

The drive shaft is a longitudinally extending shaft. The geometry of the drive shaft cross-section may be any desired geometry to fit the look of the frame of bicycle. Preferably, the geometry of the cross-section is rectangular, round, hexagonal, triangular, pentagonal, oval, heptagonal, octagonal, nonagonal or decagonal; more preferably the geometry of the cross-section is hexagonal, heptagonal, octagonal, nonagonal, decagonal, oval, or round; most preferably the cross-section is round.

The drive shaft may be solid or hollow cross-section. Preferably, the cross section is hollow, which provides a drive shaft with as low weight as possible. Additionally, electronics and mechanisms for gear shifting and/or a power meter may be placed inside the hollow shaft.

The drive shaft may be constructed of alloy steel, aluminum, plastic, carbon fiber, or composite material.

The overall length of the drive shaft is dependent on the bicycle frame design. The length of the drive shaft may be designed in any length desirable to match the bicycle frame design. The drive shaft may be a fixed-length shaft, or a telescopic drive shaft, with multi sleeve coaxial inner and outer shafts. By telescopic drive shaft, it is meant an outer hollow shaft, which is in a fixed position in relation to the fore/aft position of the bicycle frame. A coaxial shaft, of smaller diameter, and protruding from the end of the outer shaft, resides within the larger hollow shaft. The inner shaft is able to slide fore/aft within and in relation to the outer shaft, and maintain a coaxial relationship to the larger outer shaft, and the two shafts maintain the same rotational velocity by using a longitudinal keyway or slot. The keyway or slot permits transfer of rotational torque between the outer and inner shafts, and allows longitudinal sliding. The sliding action of the smaller inner shaft allows for shifting action. I.e., the roller-toothed gear assembly is attached to the protruding portion of the inner shaft. By sliding the inner shaft fore/aft, this effectively causes the gear assembly to move fore/aft, and causes a gear change between gear rings.

The front face gear and rear face gear each include a cog-disk and at least one concentric gear ring(s). Each gear-ring includes a plurality of teeth and tooth valleys, wherein the teeth extend at an angle to a surface plane of the cog-disk in the range of 0 to 120°; preferably, between 60 to 100°; more preferably either 80, 90, or 100°; and most preferably 90°.

In a chain ring of a conventional bicycle chain drive, the angle between the teeth and surface plane is 0°. In one embodiment, the axis of rotation of the roller elements on the spinner are perpendicular to and intersecting the spinner axis of rotation, the roller elements may then engage and mesh with a conventional chain ring.

In an alternative embodiment, the angle between the teeth and surface plane is approximate 90°, wherein the axis of rotation of the shaft drive and the roller elements are parallel to the spinner axis, the roller elements may then engage and mesh with the teeth of the face gear.

In yet an alternative embodiment, the angle between the teeth and surface plane of the cog-disk is approximately 45°, wherein the axis of rotation of the roller elements on the spinner are at approximately 45 degree angle to and intersect the spinner axis, the roller elements may then engage and mesh with the teeth of the face gear.

In one embodiment, each tooth on a front face gear has identical geometry; and each tooth on a rear face gear has identical geometry. This requires that the roller elements on the spinner engaging the front face gear has the same size and geometry, whereas the roller elements on the spinner engaging the rear face gear has the same size and geometry. This makes the spinners easy to produce and assemble.

In an alternative embodiment, all teeth on the front and the rear face gears have identical geometry. This requires that the roller elements on both spinners have the same size and geometry. This makes the spinners easy to produce and the drive shaft easy to assemble.

In an alternative embodiment, each tooth on a front face gear has an identical geometry, and each tooth on a rear face gear has an identical geometry, however the tooth geometry of the rear and the front face gear are different. Gear shifting and rotational force transfer may be enhanced by different tooth geometry on the rear and front face gears due to the front gear face transmitting torque to the roller elements of the front spinner, and the rear gear face receiving torque from the roller elements of the rear spinner.

In an alternative embodiment, the teeth on the front face gear have identical geometry, and the tooth valleys on the front face gear have identical geometry, and the teeth on the rear face gear have identical geometry, and the tooth valleys on the rear face gear have identical geometry. The teeth and tooth valley geometry on the front face gear and the rear face gear is either identical or different.

Each tooth of the gear-ring(s) has a height measured from the bottom of the tooth valley to the tooth tip. The dimensions of each tooth, i.e. the height and valley-to-valley length of the tooth are preferably configured to correspond closely to the dimensions of the roller element engaging with the tooth, thereby reducing the frictional forces. The pitch of the teeth is dependent on the circumferential distance between each roller element on the spinner and the radius of the gear-ring. The geometry and dimensions of the tooth valley are dependent on the geometry and dimension of the roller elements. Preferably, the general shape of the cross-section of the roller elements corresponds to the general shape of the tooth valley. This provides a meshing between the roller elements and the teeth and tooth valleys, which reduces the friction.

In one embodiment, the rotational axis of the roller-toothed gear assembly is coaxial to the drive shaft. This reduces the friction between the roller toothed gear assembly, drive shaft and the front and/or rear face gear.

In one embodiment, the rotational axes of the plurality of roller elements can be parallel to the rotational axis of the drive shaft. This reduces the friction between the roller toothed gear assembly, drive shaft and the front and/or rear face gear.

In an alternative embodiment, the rotational axes of the roller elements can be at any relative angle between 0 and 90 degrees to the rotational axis of the drive shaft, with the axes of the roller elements and axis of the driveshaft intersecting. In this embodiment, the axes of the roller elements are beveled, and the angle of teeth relative to the face gear plane are beveled accordingly, in a similar beveling manner to the conventional process of teeth beveling of 90-degree intersecting fixed-tooth gear sets.

The drive shaft may be positioned by drive shaft supports, which may be connected to the bicycle frame. The drive shaft supports may contain drive shaft support bearings. The drive shaft may be located within the inner races of the drive shaft support bearings, and coaxially to the axis of rotation of the drive shaft support bearings.

In an embodiment, a shift controller initiates the desire to change gears.

The controller may be connected by cables, wires, or wirelessly to a gear selection device comprising an electromechanical actuator in proximity to the front roller-toothed gear assembly and/or to an electromechanical actuator in proximity to the rear roller-toothed gear assembly. The front and/or rear electromechanical actuator provides the force and mechanical action to move the respective front or rear roller-toothed gear assembly to enable gear selection changes.

In one embodiment, the electromechanical gear-selection device is positioned inside of the drive shaft and connected to the gear shifting controller and the rear roller-toothed gear assembly.

In a further embodiment, the electromechanical gear-selection device is positioned inside of the drive shaft and connected to the gear shifting controller and the spinner of the rear roller-toothed gear assembly.

In one embodiment, the gear selection device's electromechanical actuator is connected by a linkage or screw drive to the rear roller-toothed gear assembly and the actuator is located externally in relation to the shaft.

In an alternative embodiment, the gear selection device's electromechanical actuator, in a wireless configuration, is connected by a linkage or linear screw drive to the rear roller-toothed gear assembly and the actuator is located internally within the drive shaft, preferably a hollow drive shaft. Batteries, which are used to power the electromechanical actuator, may also be located within the hollow shaft.

The rear roller-toothed gear assembly has the ability to slide fore and aft with respect to the drive shaft axis, whilst maintaining the ability to continuously transfer rotational torque by at least the following possibilities: 1) a method of co-axially sliding linearly along the fixed length drive shaft (i.e., the rear roller-toothed gear assembly is slotted to the drive shaft, but the roller-toothed gear assembly is not fixed fore and aft). The roller-toothed gear assembly is then able to slide fore and aft along the slotted keyway of the drive shaft, and the slotted key enables rotation of the roller-toothed gear assembly at an equal rotational velocity to the drive shaft rotation, allowing rotational torque to be transferred by the rear roller-toothed gear assembly to the selected rear face gear; or 2) using a telescoping co-axial drive shaft; or 3) other means of allowing fore and aft movement of the rear roller-toothed gear assembly, with or without simultaneous lateral movement of the rear roller-toothed gear assembly and drive shaft, while maintaining a co-axial nature to the drive shaft, and maintaining the ability to transfer torque in a rotational manner; 4) Or combinations of the above.

The electromechanical actuator linkage actuates the rear roller-toothed gear assembly to move fore and aft, changing position relative to the rear face gears to mesh and engage with discrete gear-rings on the face gear, depending on the desired gear to be selected.

In one embodiment of the invention, the bicycle rider can maintain pedaling rotation during the shifting of gears, and the rear roller-toothed gear assembly will move fore or aft between selected rear gear-rings at a point where tooth valleys on adjacent gear-rings align.

It is important for the bicycle rider to be able to shift gears. Gear shifting might be performed by using at least one shift channel.

In one embodiment, a 'shift channel' is created when the teeth of a number of concentric gear-rings on the rear face gear are aligned to form a shift channel of teeth valleys extending in a radial direction of the cog-disk.

In an alternative embodiment, the rear face gear includes a number of concentric gear rings wherein the teeth in at least some of the adjacent gear-rings are aligned so as to form a shift channel of teeth valleys extending in a radial direction of the disk.

In a further embodiment, the teeth are aligned to form multiple shift channels extending in different radial directions.

The shift channel may be formed by a single shift channel extending across all gear-rings on the rear face gear, or by using multiple shift channels, or alternatively or additionally by multiple, and offset, shorter shift channels each incorporated across two or more adjacent gear-rings on the rear face gear.

Independent of using a single shift channel, or multiple shift channels, or multiple offset shorter shift channels, the number of gears shifted in one continuous fore-aft motion of the rear roller-toothed gear assembly may depend on the velocity capability of the electromechanical actuator, force provided by the electromechanical actuator, and rotational speed of the rear face gear.

In one embodiment, if the rear face gear is designed with a single shift channel across all of the gear-rings, the bicycle rider, or automated control unit, can command a shift between the smallest diameter gear-ring and the largest diameter gear-ring. I.e., shift from the highest gear to the lowest gear at one time, with a single uninterrupted fore movement of the roller-toothed gear assembly across all gear-rings.

In an embodiment, if the rear face gear is designed with a single shift channel across all of the gear-rings, the bicycle rider, or automated control unit, can command a shift between as few as only two adjacent gears at one time, rather than shift through all of the gear-rings at one time. I.e., the rear roller-toothed gear assembly can be moved the distance of two adjacent ring gears. To shift gears again, the rear roller-toothed gear assembly will move after a minimum of one full rear cog-disk rotation, when the shift channel is again aligned with the roller-element gear assembly. At this point, another specific number of gears can be shifted as determined by the rider or automated control unit.

In an alternative embodiment, gears can be shifted by using multiple, and offset, shorter shift channels incorporated in the rear gear-rings of the rear face gear. In the case where the shift channel is across only two adjacent gear-rings, the rear roller-toothed gear assembly can move, and therefore shift, one gear at a time within the shorter shift channel. To shift another gear step, the rear roller-toothed gear assembly must pause with respect to fore-aft movement until the next shift channel comes into alignment with the roller-toothed gear ring after a small rotation of the rear cog-disk. With the multiple, and offset, shift channel configuration, all of the offset shift channels occur within a 360 degree rotation of the rear face gear. That is, shifting between the lowest and highest gears can be accomplished within one full rotation of the rear face gear. If, for instance, the rear face gear contains 12 concentric gear-rings, and a shift across all 12 gears is commanded, the rear roller-toothed gear assembly will make 11 discrete movements between 11 offset shift channels within one rotation of the rear face gear.

The afore mentioned shifting process of the rear roller-toothed gear assembly utilizing shift channels within the rear concentric gear-rings can likewise be applied as a shifting process of the front roller-toothed gear assembly utilizing shift channels within the front concentric gear-rings.

It is important to protect the entire bicycle drive system against mud, dirt, dust, rain, soap and water while washing the bike, and foreign objects.

The bicycle drive system requires maintenance, when using the bicycle drive system in muddy, dusty or rainy conditions. The roller elements drive shaft and/or front and/or rear face gears should be isolated from mud, dust, and dirt in order for optimal performance of the bicycle drive system. The lifetime of the roller elements might be reduced if the roller elements are exposed to contaminants.

For a maintenance-free bicycle drive system, it is advantageous to at least partly enclose the bicycle drive system in a protective cover. The partly enclosed protective cover will protect the exposed parts of the system. If a completely maintenance-free bicycle drive system is desired, then the bicycle drive system might be completely enclosed by the protective cover. A completely enclosed cover, means that there is no need for maintenance of the roller elements, drive shaft and/or front and/or rear face gears when using the bicycle in any conditions.

The protective cover may be any material suited to be used as a protective cover such as plastic or metal.

In an alternative embodiment, the protective cover is a hard protective cover, which also protects the bicycle drive system against damage while riding from larger solid foreign objects, or riding accidents.

In one embodiment, ball bearings are used as roller elements, wherein the bearings are equipped with conventional bearings seals. The seals are a pliable material, preferably rubber, silicone, or suitable polymer. The seals cover the gap between the bearing inner race and bearing outer race, advantageously protecting the bearing internal rolling parts from contaminants. The seals are also advantageous in keeping lubrication within the bearing. Hereby the protection of the internal parts of the individual roller elements from contaminants aid in ensuring a highly efficient drive system.

Bicycle power meters, which sense and provide the rider's power output, are a common feature of modern bicycles. A power meter can be incorporated into this invention, by placing sensors on the drive shaft to measure the rotational torque being transferred through the drive shaft between the front and rear roller-toothed gear assemblies.

In one embodiment, a power meter is connected to the drive shaft. In order for the power meter to measure the force used, torsional strain gauges are installed on the drive shaft to measure torsional deformation of the drive shaft. An accelerometer or magnetic switch may be installed on the drive shaft to measure rotations per unit time of the drive shaft. Hardware may be installed within the shaft to collect the torsional deformation and rotational data. The electronics comprising the hardware convert the drive shaft torsional deformation signal and drive shaft rotational signal to a rider power-output measurement. A may be rechargeable battery is located in the shaft to power the hardware and electronics.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing.

The present invention includes a bicycle having the standard components such as wheels 2, crank arm 5, seat 10, and handlebars 9. These standard components are not modified by the invention (FIG. 1). According to the invention, standard frames 3 from different frame manufactures can be used with an elevated chain stay 30.

Figure 2:
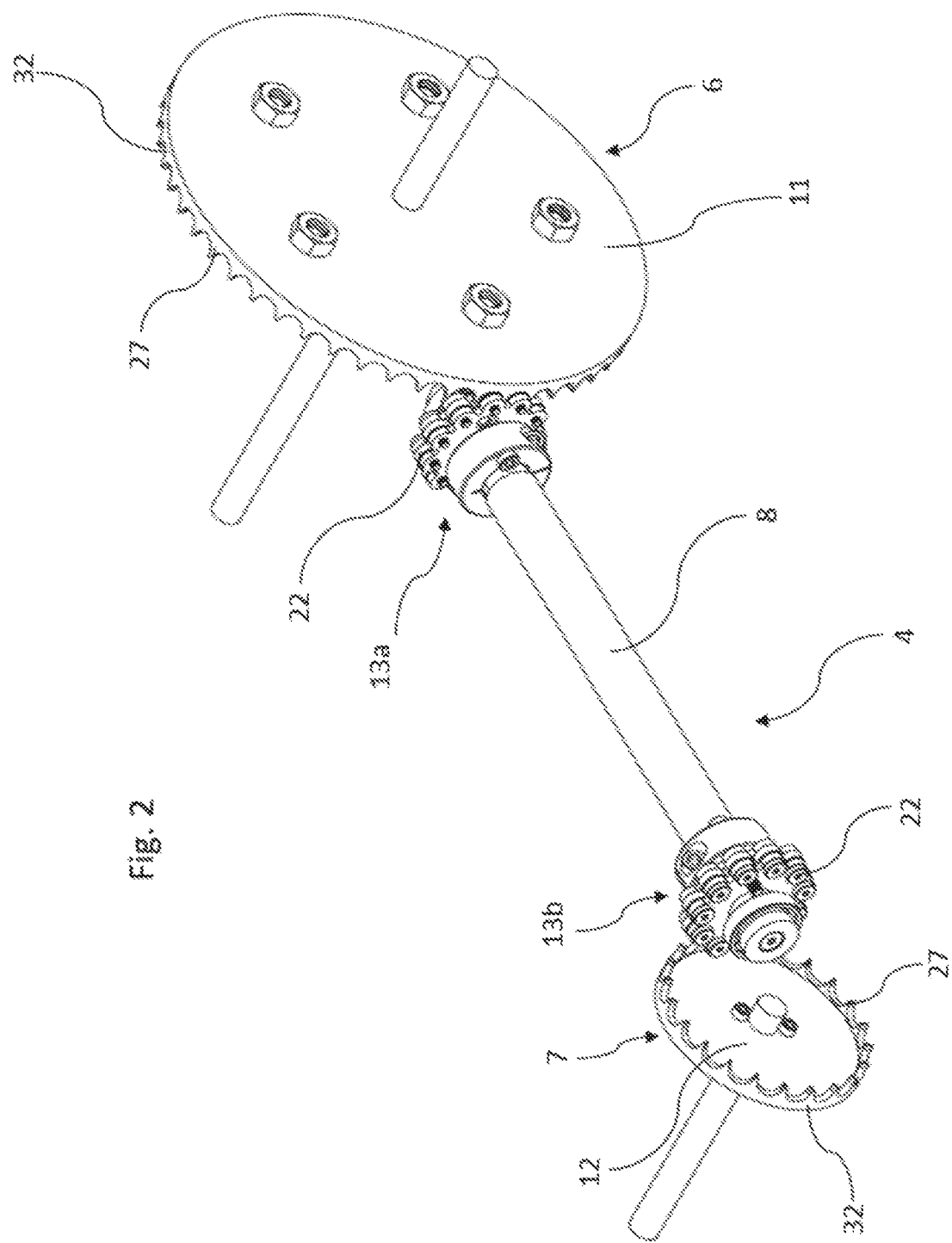
FIG. 2 is a drawing of an embodiment of a bicycle drive system as a single-gear configuration.

FIG. 2 illustrates a schematic drawing of a single-gear drive system 4; however, a multi-gear drive system can be obtained using the same elements from the single-gear drive system 4. Both the single-gear and multi-gear drive systems 4 includes a front cog-disk 11 and a rear cog-disk 12. The front cog-disk 11 is attached to the crank arm 5 (see FIG. 1) as in a conventional bicycle drive train. The rear cog-disk 12 is attached to the rear wheel 2b. The rotational force, provided by the bicycle rider, while pedaling, is transferred to the rear wheel 2b. The drive system 4 transfers energy from the bicycle pedals to the rear wheel 2b. The drive system 4 includes a drive shaft 8. A roller-element gear assembly 13a is attached to the first end of the drive shaft 8, and another roller-element gear assembly 13b is attached to the second end of the drive shaft 8. The attachment might be with any suitable means for example with collars. Each roller-element gear assembly 13a-b is positioned to mesh and engage with the front cog-disk 11 and the rear cog-disk 12, respectively.

Figure 3:
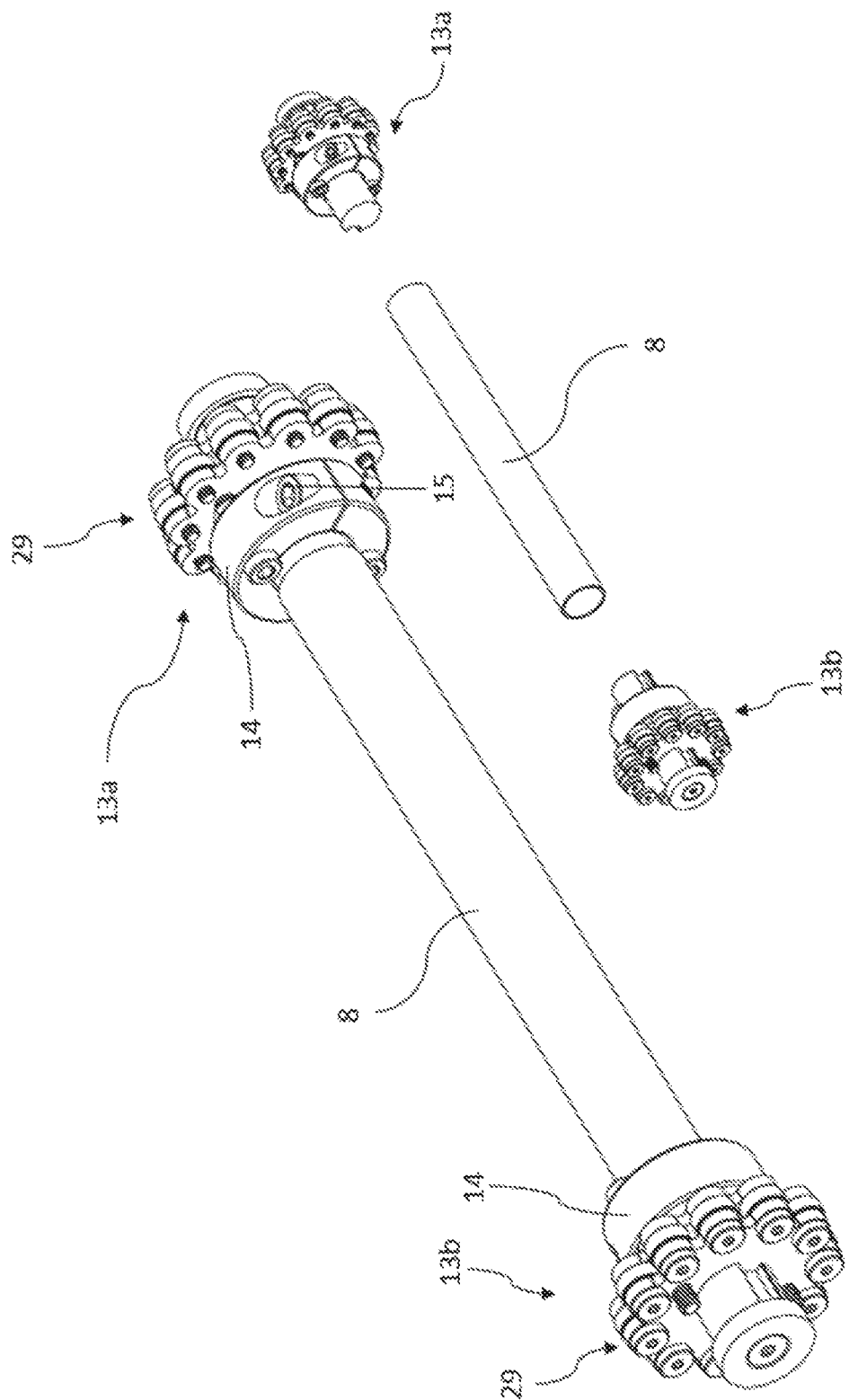
FIG. 3 shows an exploded view of the drive shaft system of FIG. 2.

FIG. 3 illustrates an exploded view of the drive system 4, and FIG. 4 illustrates an exploded view of the roller-toothed gear assembly 13. The roller-toothed gear assembly 13 includes a keyed connector 16. The keyed connector has a keyway 25 which in the shown embodiment is machined on the entire length. A hole 26 is placed in the center of the rod end of the keyed connector 16 and may be extending axially through the entire length. In one example of the invention, the hole 26 does not extend through the entire length, but the length matches that of the end cap bolt 15. The hole 26 may preferably be threaded.

The roller-element gear assembly 13a-b is built onto the keyed connector 16. Each roller-element gear assembly 13 includes a spinner 29. The spinner includes a plurality of roller elements 22 and two plates 20, 23. The roller elements 22 are placed between a spinner outer plate 20 and a spinner inner plate 23. The spinner inner plate 23, the spinner outer plate 20 and the roller elements 22 are fastened together using fastening means 15. The fastening means may be any suitable fastening means, preferably the fastening means are bearing bolts. The spinner inner plate 23, the spinner outer plate 20 and the roller elements 22 are attached to the keyed connector 16 using a shaft collar 14, collar locating bolt 15, collar nut 24, end cap 18 and an end cap bolt 15 as shown in the FIG. 4. The aspect ratio (roller length/roller diameter) of the roller elements shown in the embodiment is less than 0.5.

In FIG. 4, ball bearings are utilized as the roller elements 22. The ball bearings used are conventional ball bearings comprising an outer raceway, an inner raceway and a number of balls located between the inner and outer raceway.

The outer plate 20 and the inner plate 23 engages each of the inner raceways of the ball bearings 22. This renders the balls and outer raceway free to rotate around the inner raceway of the ball bearing.

As shown in FIG. 3, each spinner 29 is connected to the drive shaft 8 using the keyed connectors 16.

As shown in FIGS. 5, 6 and 7, the front face gear 6 and the rear face gear 7 has respectfully a front cog-disk 11 and a rear cog-disk 12. Both face gears 6, 7 are designed to have a cog-disk and at least one concentric gear-ring(s) 32. Each gear-ring 32 has a plurality of teeth 27. Next to each tooth 27, a tooth valley 28 is present. The number of teeth in each concentric gear-ring 32 can vary and is dependent on the diameter of the cog-disk 11, 12 and the gear-ring 32. As shown in FIGS. 5, 6 and 7, all of the teeth 27 and tooth valleys 28 has the same geometry and size. The roller elements 22 are engaging the teeth 27 and tooth valleys 28 of the front or rear face gears 6, 7. Each face gear is designed, such that the teeth 27 are placed at an angle to the cog-disk surface (FIG. 10). The angle between the teeth 27 and cog-disk 11, 12 surface is preferably 90°, as shown in FIG. 10, but may alternatively be between 0-120°.

The teeth 27 of each gear-ring 32 are such designed that the roller elements 22 fits into the tooth valleys 28. The tooth profile and the profile of the roller elements are designed so that the interaction between the teeth 27 and the roller elements 22 is of a rolling nature and friction is minimized or at least reduced considerably. This ensures a very high efficient drive system with a minimal level of friction. The tooth profile is dependent on the size and shape of the roller elements 22. The tooth profile is designed such that the roller elements 22 fits into the tooth valleys as shown in FIGS. 5, 6 and 7. By fitting together means that the shape and size of the tooth valleys 28 corresponds in a similar manner to the complementary shape and size of the roller elements. It is important that the roller elements do not bind and do not create mechanical interference to the teeth 27 and tooth valleys 28 during meshing. Binding and interference of the roller elements on the teeth and tooth valleys can cause damage to the roller elements. When the teeth mesh and engage with the rolling elements, the teeth apply a force to the roller elements. This force line can be slightly off center, then center, and again off center, as the rolling elements engages, rolls through, and disengages the tooth. To eliminate the binding of the roller elements on the teeth and tooth valleys, the correct tooth shape, pitch and tooth beveling is very important. An optimal tooth profile is shown in FIGS. 11 and 12. Both FIGS. 11A and 12A are zoom-ins of the FIG. 11 and FIG. 12 respectfully. In FIG. 11 is shown a cog-disk 11, 12 with the teeth surface perpendicular to the cog-disk surface. The teeth have a planar surface, which does not include any beveled surfaces.

The tooth profile illustrated in FIGS. 12 and 12A is slightly different from the tooth profile of FIG. 11, because the tooth profile in FIG. 12 has a slightly beveled surface from the tooth tip 34 to the middle of the tooth length. The tooth profile of FIG. 12 reduces the friction between teeth and roller elements compared to the tooth profile of FIG. 11. Due to the gear-ring teeth entering the meshing zone on a specific arc and plane, and the rolling elements entering the meshing zone at a specific, yet different, arc and plane, the beveling of the teeth compensates for the non-linear force lines of the of the roller elements to the tooth engagement points as the gear-ring teeth enter and exit the meshing zone.

FIGS. 8, 9 and 10 illustrate a multi-gear rear face gear 7. In these figures, the drive shaft 8 is not shown in its full length. The multi-gear rear face gear 7 includes a cog-disk 12 with a multiple number of concentric gear-rings 32. In the embodiment shown in the figure, the cog-disk includes 14 concentric gear-rings, but could be any number of desired gear-rings for example from 10 to 30. The rear face gear 7 includes a rear cog-disk 12 having a rotational plane parallel to the rear wheel 2b and co-axial relationship to the rear wheel axle.

In FIG. 8, the roller-toothed gear assembly's spinner 29 is meshed and engaged with the concentric gear-ring 32a with the largest diameter, whereas in FIG. 9 the roller-toothed gear assembly's spinner 29 is engaged and meshed with a middle-sized concentric gear-ring 32b. Each gear-rings 32 includes a fixed number of teeth 27 and tooth valleys 28. In the shown embodiment, the smallest gear-ring 32c size includes 16 teeth, whereas the largest cog size includes 54 teeth 32a. The spacing between the rings is such that the rear spinner 29 may be meshed and engaged with a single gear-ring of gear teeth 32 at a time.

When the drive system 4 is in motion, the ball bearings 22 in each of the spinners 29 in the roller-element gear assemblies 13a-b mesh and engage the teeth 27 of a front face gear 6 or a rear face gear 7. More specifically, the outer raceway of a ball bearing engages with a tooth tip 34 and subsequently a tooth valley 28, as both the raceway and teeth mesh together, which results in the ball bearing 22 rotating. This rotation of the ball bearings ensures that the amount of friction generated, during meshing, between the face gear teeth 27 and the roller-toothed gear assembly 13 is a minimum. This result is an overall lower amount of rider energy wasted as a result of friction.

In FIG. 10, a specific 'shift channel' is shown by the arrow (A). The shift channel is created by specific alignment of adjacent rear gear-rings on the cog-disk 12. The shift channel is created when a plurality of concentric gear-rings 32 adjacent to each other are aligned on the cog-disk 12 in a manner such that the tooth valleys 28 of one or more adjacent gear-rings are aligned in a radial manner.

Shifting can occur when a rolling element 22 is midway through the meshing cycle and the rolling element is positioned at the bottom of the tooth valley 28. At this point, the roller-toothed gear assembly 13 comprising the roller elements 22 can be slid fore/aft between adjacent gear-rings 32, through the shift channel of aligned tooth valley(s).

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. A multi-gear bicycle drive system comprising a drive shaft, the drive shaft being configured for connecting a front face and rear face gear of the bicycle drive system, the bicycle drive system comprising:
    a front face gear comprising a cog-disk and at least one concentric gear-ring comprising a first set of fixed gear teeth, wherein the first set of gear teeth are fixed relative to the at least one concentric gear-ring of the front face gear;
    a rear face gear comprising a cog-disk and at least a plurality of concentric gear-rings comprising a second set of fixed gear teeth, wherein the second set of gear teeth are fixed relative to the plurality of concentric gear-rings of the rear face gear; and
    a shaft having an axis of rotation and having a first end of the drive shaft and a second end,
    wherein the drive shaft further comprises:
        a roller-toothed gear assembly coupled to at least one of the first end of the drive shaft or the second end of the drive shaft,
        wherein the roller-toothed gear assembly is configured to mesh with at least one of the plurality of concentric gear-rings of the rear face gear, so that rotational movement of the gear-ring is transmitted to the shaft,
        wherein the roller-toothed gear assembly comprises at least one roller element,
        wherein the at least one roller element of the roller-toothed gear assembly engages at least one of the plurality of concentric gear-rings of the rear face gear,
        wherein the at least one roller element comprises an inner raceway, an outer raceway, and rollers between the inner raceway and the outer raceway, the at least one roller element being at least one of a ball bearing, a roller bearing, or a double row ball,
        wherein the outer raceway of the at least one roller element engages the second set of fixed gear teeth of the plurality of concentric gear-rings of the rear face gear, and
        wherein the at least one roller element is movable fore and aft relative to the rear face gear between a first position, in which the at least one roller element is engaged with a first gear-ring of the plurality of concentric gear-rings of the rear face gear, and a second position, in which the at least one roller element is engaged with a second gear-ring of the plurality of concentric gear-rings of the rear face gear.

2. The bicycle drive system according to claim 1, wherein the roller-toothed gear assembly is a first roller-toothed gear assembly coupled to the first end of the drive shaft and wherein the drive shaft further comprises a second roller-toothed gear assembly coupled to the second end of the drive shaft, wherein the second roller-toothed gear assembly comprises at least one roller element, and wherein the at least one roller element of the first roller-toothed gear assembly engages the at least one concentric gear-ring of the front face gear.

3. The bicycle drive system according to claim 2, wherein the first roller-toothed gear assembly comprises a spinner, and wherein the spinner comprises roller elements uniformly distributed at a radial distance from a center of the spinner.

4. The bicycle drive system according to claim 1, wherein the drive shaft comprises at least one of: a telescopic drive shaft comprising at least one of coaxial inner and outer shafts; a fixed length multi sleeve coaxial shaft; or a single shaft.

5. The bicycle drive system according to claim 1, wherein the second set of gear teeth of the rear face gear and the first set of gear teeth of the front face gear each comprise a plurality of teeth and tooth valleys, wherein the teeth extend at an angle to a surface plane of the cog-disk from about 0° to about 120°, wherein the roller gear assembly comprises a first spinner plate and a second spinner plate, wherein the at least one roller element is between the first spinner plate and the second spinner plate, and wherein the first spinner plate and the second spinner plate are each engaged with the inner raceway of the at least one roller element.

6. The bicycle drive system according to claim 1, wherein the second set of gear teeth of the rear face gear and first set of gear teeth of the front face gear each comprise a plurality of teeth and tooth valleys, wherein the teeth on the front face gear are of identical geometry, wherein the teeth on the rear face gear are of identical geometry, wherein each tooth valley has a valley shape, and wherein the valley shape corresponds to a cross-sectional shape of the at least one roller element.

7. The bicycle drive system according to claim 6, wherein the teeth in at least some of the concentric gear-rings of the rear face gear are placed so as to form a shift channel of teeth valleys extending in a radial direction of the cog-disk of the rear face gear.

8. The bicycle drive system according to claim 7, wherein the teeth are placed to form a plurality of shift channels extending in different radial directions.

9. The bicycle drive system according to claim 1, wherein the bicycle drive system is at least partly enclosed in a protective cover.

10. The bicycle drive system according to claim 1, wherein the drive shaft comprises at least one torsional strain gauge.

11. The bicycle drive system according to claim 1, wherein at least the first set of fixed gear teeth of the front face gear or the second set of fixed gear teeth of the rear face gear comprise a plurality of tooth valleys, wherein each tooth valley is between adjacent fixed gear teeth of the first set of fixed gear teeth or of the second set of fixed gear teeth, and wherein each tooth valley comprises a valley shape that corresponds to a cross-sectional shape of the at least one roller element.

12. The bicycle drive system of claim 11, wherein the valley shape is an arc.

13. A multi-gear bicycle drive system comprising a drive shaft, the drive shaft being configured for connecting a front face and rear face gear of the bicycle drive system, the bicycle drive system comprising:
a front face gear comprising a cog-disk and at least one concentric gear-ring;
a rear face gear comprising a cog-disk and at least a plurality of concentric gear-rings; and
a shaft having an axis of rotation and having a first end of the drive shaft and a second end,
wherein the drive shaft further comprises:
a roller-toothed gear assembly coupled to at least one of the first end of the drive shaft or the second end of the drive shaft,
wherein the roller-toothed gear assembly is configured to mesh with at least one of the plurality of concentric gear-rings of the rear face gear, so that rotational movement of the gear-ring is transmitted to the shaft,
wherein the roller-toothed gear assembly comprises a first spinner plate, a second spinner plate, and at least one roller element between the first spinner plate and the second spinner plate,
wherein the at least one roller element of the roller-toothed gear assembly engages at least one of the plurality of concentric gear-rings of the rear face gear,
wherein the at least one roller element comprises an inner raceway, an outer raceway, and rollers between the inner raceway and the outer raceway, the at least one roller element being at least one of a ball bearing, a roller bearing, or a double row ball,
wherein the outer raceway of the at least one roller element engages the at least one concentric gear-ring of the front face gear or at least one of the plurality of concentric gear-rings of the rear face gear,
wherein the first spinner plate and the second spinner plate are each engaged with the inner raceway of the at least one roller element, and
wherein the at least one roller element is movable fore and aft relative to the rear face gear between a first position, in which the at least one roller element is engaged with a first gear-ring of the plurality of concentric gear-rings of the rear face gear, and a second position, in which the at least one roller element is engaged with a second gear-ring of the plurality of concentric gear-rings of the rear face gear.

14. The bicycle drive system according to claim 13, wherein at least one of the at least one concentric gear-ring of the front face gear or the plurality of concentric gear-rings of the rear face gear comprise a plurality of teeth and a plurality of tooth valleys, wherein each tooth valley extends between adjacent teeth, and wherein each tooth valley comprises a valley shape that corresponds to a cross-sectional shape of the at least one roller element.

15. The bicycle drive system of claim 14, wherein the valley shape is an arc.

16. The bicycle drive system of claim 14, wherein the plurality of teeth are fixed relative to the cog disk of the front face gear or relative to the cog disk of the rear face gear.

17. A multi-gear bicycle drive system comprising a drive shaft, the drive shaft being configured for connecting a front face and rear face gear of the bicycle drive system, the bicycle drive system comprising:
a front face gear comprising a cog-disk and at least one concentric gear-ring;
a rear face gear comprising a cog-disk and at least a plurality of concentric gear-rings; and
a shaft having an axis of rotation and having a first end of the drive shaft and a second end,
wherein the drive shaft further comprises:
a roller-toothed gear assembly coupled to at least one of the first end of the drive shaft or the second end of the drive shaft,
wherein the roller-toothed gear assembly is configured to mesh with at least one of the plurality of concentric gear-rings of the rear face gear, so that rotational movement of the gear-ring is transmitted to the shaft,
wherein the roller-toothed gear assembly comprises at least one roller element,
wherein the at least one roller element of the roller-toothed gear assembly engages at least one of the plurality of concentric gear-rings of the rear face gear,
wherein the at least one roller element comprises an inner raceway, an outer raceway, and rollers between the inner raceway and the outer raceway, the at least one roller element being at least one of a ball bearing, a roller bearing, or a double row ball,
wherein the outer raceway of the at least one roller element engages at least one of the plurality of concentric gear-rings of the rear face gear, and
wherein the at least one roller element is movable fore and aft relative to the rear face gear between a first position, in which the at least one roller element is engaged with a first gear-ring of the plurality of concentric gear-rings of the rear face gear, and a second position, in which the at least one roller element is engaged with a second gear-ring of the plurality of concentric gear-rings of the rear face gear.

18. The bicycle drive system according to claim 17, wherein the plurality of concentric gear-rings of the rear face gear comprise a plurality of teeth and a plurality of tooth valleys, wherein each tooth valley extends between adjacent teeth, and wherein each tooth valley comprises a valley shape that corresponds to a cross-sectional shape of the at least one roller element.

19. The bicycle drive system of claim 18, wherein the valley shape is an arc.

20. The bicycle drive system of claim 18, wherein the plurality of teeth are fixed relative to the cog disk of the rear face gear.

* * * * *